US005925712A

United States Patent [19]

Kronzer

[11] Patent Number: 5,925,712

[45] Date of Patent: Jul. 20, 1999

[54] FUSIBLE PRINTABLE COATING FOR DURABLE IMAGES

[75] Inventor: Francis Joseph Kronzer, Marietta, Ga.

[73] Assignee: Kimberly-Clark Worldwide, Inc., Neenah, Wis.

[21] Appl. No.: 08/954,440

[22] Filed: Oct. 20, 1997

Related U.S. Application Data

[63] Continuation of application No. 08/689,980, Aug. 16, 1996, abandoned.

[51] Int. Cl.[6] .............................. C08L 39/00; C08L 77/00

[52] U.S. Cl. .............................. 524/555; 524/502; 524/514; 524/515; 523/206

[58] Field of Search .............................. 524/502, 514, 524/555, 515; 523/206, 200

[56] References Cited

U.S. PATENT DOCUMENTS

| | | | |
|---|---|---|---|
| 3,016,599 | 1/1962 | Perry, Jr. | 28/78 |
| 3,341,394 | 9/1967 | Kinney | 161/72 |
| 3,655,862 | 4/1972 | Dorschner et al. | 264/290 |
| 3,692,618 | 9/1972 | Dorschner et al. | 161/72 |
| 3,704,198 | 11/1972 | Prentice | 161/148 |
| 3,705,068 | 12/1972 | Dobo et al. | 156/441 |
| 3,755,527 | 8/1973 | Keller et al. | 264/210 |
| 3,802,817 | 4/1974 | Matsuki et al. | 425/66 |
| 3,849,241 | 11/1974 | Butin et al. | 161/169 |
| 3,853,651 | 12/1974 | Porte | 156/73.6 |
| 3,978,185 | 8/1976 | Butin et al. | 264/93 |
| 4,064,605 | 12/1977 | Akiyama et al. | 28/103 |
| 4,091,140 | 5/1978 | Harmon | 428/288 |
| 4,100,319 | 7/1978 | Schwartz | 428/171 |
| 4,100,324 | 7/1978 | Anderson et al. | 428/288 |
| 4,118,531 | 10/1978 | Hauser | 428/224 |
| 4,250,269 | 2/1981 | Buckman et al. | 524/514 |
| 4,308,542 | 12/1981 | Maekawa et al. | 346/1.1 |
| 4,340,563 | 7/1982 | Appel et al. | 264/518 |
| 4,405,297 | 9/1983 | Appel et al. | 425/725 |
| 4,434,204 | 2/1984 | Hartman et al. | 428/198 |
| 4,442,172 | 4/1984 | Oshima et al. | 428/342 |
| 4,442,247 | 4/1984 | Ishikura et al. | 524/502 |
| 4,517,244 | 5/1985 | Kobayashi et al. | 428/342 |
| 4,547,405 | 10/1985 | Bedell et al. | 428/331 |
| 4,588,537 | 5/1986 | Klaase et al. | 264/22 |
| 4,592,815 | 6/1986 | Makao | 204/165 |
| 4,627,811 | 12/1986 | Greiser et al. | 425/72 S |
| 4,644,045 | 2/1987 | Fowells | 526/348 |
| 4,663,220 | 5/1987 | Wisneski et al. | 428/22 |
| 4,680,235 | 7/1987 | Murakami et al. | 428/414.4 |
| 4,686,118 | 8/1987 | Arai et al. | 427/261 |
| 4,785,313 | 11/1988 | Higura et al. | 427/161 |
| 4,877,678 | 10/1989 | Hasegawa et al. | 428/216 |
| 4,877,680 | 10/1989 | Sakaki et al. | 428/332 |
| 4,887,097 | 12/1989 | Akiya et al. | 346/135.1 |
| 4,944,988 | 7/1990 | Yasuda et al. | 428/195 |
| 5,027,131 | 6/1991 | Hasegawa et al. | 346/1.1 |
| 5,068,140 | 11/1991 | Malhotra et al. | 428/216 |

(List continued on next page.)

FOREIGN PATENT DOCUMENTS

| | | |
|---|---|---|
| 0 184 797 A2 | 6/1986 | European Pat. Off. . |
| 0 279 671 A2 | 8/1988 | European Pat. Off. . |
| 0 682 147 A1 | 11/1995 | European Pat. Off. . |
| 359196285 | 11/1984 | Japan . |
| 2 301 844 | 12/1996 | United Kingdom . |

OTHER PUBLICATIONS

"Superfine Thermoplastic Fibers" by V.A. Wente, Industrial and Engineering Chemistry, vol. 48, No. 8, pp. 1342–1346 (1956).

"Manufacture of Superfine Organic Fibers", by V.A. Wente et al., Navy Research Laboratory, Washington, D.C., NRL Report 4364 (111437), May 25, 1994, US Dept. of Commerce, Office of Technical Services.

"Melt Blowing—A One–Step Web Process for New Nonwoven Products" by R.R. Butin et al., Journal of the Technical Association of the Pulp and Paper Industry, vol. 56, No. 4, pp. 74–77 (1973).

"After–treatment of recording medium–by applying plasticiser to recording layer and heating treating" Mitsubishi Paper Mills LTD (MITY), Patent No. JP 59196285/A, Nov. 7, 1984, Application No. JP 8371943A, Apr. 22, 1983 and Patent No. JP 90031671B, Jul. 16, 1990 Application No. JP 8371943A, Apr. 22, 1983.

"Water absorbing sheet—comprises mocropourous porous base on which cold water insoluble natural acidic polysaccharide, chitosan, agar or gelatin is deposited." Mitsubishi Acetate Co. Ltd, Patent No. JP 2006848A, Jan. 11, 1990, Application No. JP 88156184 A, Jun. 24, 1988.

(List continued on next page.)

*Primary Examiner*—Tae Yoon
*Attorney, Agent, or Firm*—William E. Maycock

[57] ABSTRACT

A coating composition which encompasses an aqueous dispersion of from about 2 to about 40 percent by dry weight, based on the dry weight of the coating composition, of a cationic polymer; and from about 60 to about 98 percent by dry weight, based on the dry weight of the coating composition, of a nonionic or cationic binder. The coating composition is thermally fusible and adapted to be receptive to ink jet inks and to retain the ink jet inks after being thermally fused. Alternatively, the coating composition may encompass an aqueous dispersion of a powdered thermoplastic polymer and from about 10 to about 150 dry parts by weight of a binder, based on 100 dry parts by weight of the powdered thermoplastic polymer. Desirably, the coating composition will encompass an aqueous dispersion of a powdered thermoplastic polymer; from about 2 to about 50 dry parts by weight, based on 100 dry parts by weight of the powdered thermoplastic polymer, of a cationic polymer; and from about 10 to about 150 dry parts by weight, based on 100 dry parts by weight of the powdered thermoplastic polymer, of a nonionic or cationic binder. The coating composition also may contain from about 1 to about 5 parts by weight, based on the weight of the coating composition, of a surfactant. When applied to a substrate, the coating composition permits printing on the substrate with ink jet inks to give a printed image which is durable, especially in the presence of water.

12 Claims, No Drawings

U.S. PATENT DOCUMENTS

| | | | |
|---|---|---|---|
| 5,075,153 | 12/1991 | Malhotra | 428/207 |
| 5,101,218 | 3/1992 | Sakaki et al. | 346/1.1 |
| 5,102,731 | 4/1992 | Takimoto et al. | 428/323 |
| 5,120,601 | 6/1992 | Kotaki et al. | 428/327 |
| 5,165,973 | 11/1992 | Kojima et al. | 428/331 |
| 5,178,944 | 1/1993 | Horiuichi et al. | 428/341 |
| 5,180,624 | 1/1993 | Kojima et al. | 428/211 |
| 5,194,317 | 3/1993 | Kazuo et al. | 428/195 |
| 5,206,071 | 4/1993 | Atherton et al. | 428/195 |
| 5,241,006 | 8/1993 | Iqbal et al. | 525/196 |
| 5,242,739 | 9/1993 | Kronzer et al. | 428/200 |
| 5,270,103 | 12/1993 | Oliver et al. | 428/219 |
| 5,274,055 | 12/1993 | Honig et al. | 524/555 |
| 5,277,965 | 1/1994 | Malhotra | 428/216 |
| 5,314,713 | 5/1994 | Mori et al. | 427/152 |
| 5,350,796 | 9/1994 | Devore et al. | 524/514 |
| 5,405,678 | 4/1995 | Bilodeau | 428/211 |
| 5,439,739 | 8/1995 | Furukawa et al. | 428/341 |
| 5,472,789 | 12/1995 | Iqbal et al. | 428/483 |
| 5,496,634 | 3/1996 | Ogawa et al. | 428/341 |
| 5,501,902 | 3/1996 | Kronzer | 428/323 |
| 5,515,093 | 5/1996 | Haruta et al. | 347/101 |

OTHER PUBLICATIONS

"Ink jet recording method, for colour copying machine, etc.—by applying ink on ink carriage of recording material with transparent resin layer, etc." Canon KK (CANO), Patent No. JP 01–237187/A, Mar. 18, 1988 and Patent No. JP 8863502/A, Mar.18, 1988.

"Ink jet recording method—using ink carriage with layer of certain ink–retaining capacity and passing excess ink to border of transparent layer.", Canon KK (CATO), Patent No. JP 01–237188/A, Sep. 21, 1989, Application No. JP 8863502/A, Mar 18, 1988.

FUSIBLE PRINTABLE COATING FOR DURABLE IMAGES

This application is a continuation of application Ser. No. 08/689,980 entitled "Fusible Printable Coating for Durable Images" and filed in the U.S. Patent and Trademark Office on Aug. 16, 1996 now abandoned. The entirety of this Application is hereby incorporated by reference.

BACKGROUND OF THE INVENTION

The present invention relates to printable materials. More particularly, the present invention relates to ink jet printable materials.

The popularity in recent years of personal computers in homes and businesses has stimulated the development of several types of printers. The earlier, relatively low cost printers were impact or dot-matrix printers which utilized a ribbon and a plurality of pins to place a desired image on a substrate which typically was paper. While the better dot-matrix printers are capable of near letter-quality printing, they typically are both slow and noisy. Laser printers are quiet, produce high-quality images, and can print an excess of four pages per minute. Such printers, however, tend to be too expensive for common use in homes and even in some smaller businesses. Ink jet printers fill the gap between dot-matrix printers and laser printers, both with respect to cost and image quality.

Ink jet inks, however, are aqueous-based systems. That is, the dyes employed in such inks are soluble in water. Thus, substrates printed with ink jet inks have a pronounced proclivity to run or even lose an image in the presence of moisture or water. Accordingly, there is a need for a means of permitting printing on a substrate with ink jet inks, whereby the printed image is durable, especially in the presence of water.

SUMMARY OF THE INVENTION

The present invention addresses some of the difficulties and problems discussed above by providing a coating composition which encompasses an aqueous dispersion of from about 2 to about 40 percent by dry weight, based on the dry weight of the coating composition, of a cationic polymer, and from about 60 to about 98 percent by dry weight, based on the dry weight of the coating composition, of a nonionic or cationic binder. The coating composition is thermally fusible and adapted o be receptive to ink jet inks and to retain the ink jet inks after being thermally fused. The coating composition also may contain from about 1 to about 5 parts by weight, based on the weight of the coating composition, of a nonionic or cationic surfactant. For example, the surfactant may be a nonionic surfactant.

The present invention also provides a coating composition which encompasses an aqueous dispersion of a powdered thermoplastic polymer and from about 10 to about 150 dry parts by weight, based on 100 dry parts by weight of the powdered thermoplastic polymer, of a binder. The coating composition is thermally fusible and adapted to be receptive to ink jet inks and to retain the ink jet inks after being thermally fused. If desired, the coating composition may contain from about 1 to about 5 parts by weight, based on the weight of the coating composition, of a surfactant. By way of example, the surfactant may be a nonionic surfactant.

The present invention further provides a coating composition which encompasses an aqueous dispersion of a powdered thermoplastic polymer; from about 2 to about 50 dry parts by weight, based on 100 dry parts by weight of the powdered thermoplastic polymer, of a cationic polymer; and from about 10 to about 150 dry parts by weight, based on 100 dry parts by weight of the powdered thermoplastic polymer, of a nonionic or cationic binder. Again, the coating composition is thermally fusible and adapted to be receptive to ink jet inks and to retain the ink jet inks after being thermally fused. The coating composition optionally may contain from about 1 to about 10 parts of a nonionic or cationic surfactant. For example, the surfactant may be a nonionic surfactant.

By way of example, the powdered thermoplastic polymer may be a polyethylene. Further by way of example, the powdered thermoplastic polymer may be a polyamide. For example, the powdered thermoplastic polymer may be a copolymer of ϵ-caprolactam and laurolactam. As an additional example, the cationic polymer may be an amide-epichlorohydrin copolymer. As yet a further example, the binder may be an ethylene-vinyl acetate copolymer.

The present invention additionally provides an ink jet printable material which includes a substrate and a coating on the surfaces of the substrate. The coating is thermally fusible and adapted to be receptive to ink jet inks and to retain the ink jet inks after being thermally fused. The coating may be formed from any of the coating compositions described above. The substrate may be, by way of example only, a cellulosic sheet-like material. For example, the substrate may be a paper, such as a latex-impregnated paper. As another example, the substrate may be a fiber or a plurality of fibers. For example, the substrate may be a yarn. As a further example, the substrate may be a knitted or woven fabric. As still another example, the substrate may be a nonwoven web, such as a meltblown or spunbond nonwoven web.

The present invention still further provides a method for producing a durable image on a substrate with water-soluble inks. The method encompasses providing a substrate and coating the substrate with a coating composition. The coating composition encompasses an aqueous dispersion of a powdered thermoplastic polymer; from about 2 to about 50 dry parts by weight, based on 100 dry parts by weight of the powdered thermoplastic polymer, of a cationic polymer; and from about 10 to about 150 dry parts by weight, based on 100 dry parts by weight of the powdered thermoplastic polymer, of a nonionic or cationic binder. The coating composition is thermally fusible and adapted to be receptive to water-soluble inks and to retain the water-soluble inks after being thermally fused. The coated substrate then is dried and an image is printed with water-soluble inks on the coating on the substrate. The resulting image-bearing coating on the substrate then is thermally fused. By way of example, the water soluble inks may be ink jet inks.

DETAILED DESCRIPTION OF THE INVENTION

The term "yarn" is used generically herein to mean a continuous strand of textile fibers, filaments, or material in a form suitable for knitting, weaving, or otherwise intertwining to form a textile fabric. Thus, the term includes, but is not limited to, the following forms: (1) a number of fibers twisted together, i.e., spun yarn; (2) a number of filaments laid together without twist; (3) a number of filaments laid together with a degree of twist, including false twist; (4) a single filament with or without twist (i.e., a monofilament); and (5) a narrow strip of material, such as paper, plastic film, or metal foil, with or without twist, intended for use in a textile construction.

As used herein, the term "fiber" is meant to include both a continuous and a noncontinuous fiber. A continuous fiber may be a monofilament or a fiber produced by, for example, a spunbonding process. More generally, a continuous fiber is deemed to be any fiber wherein the length of the fiber may be considered infinite in comparison with its diameter. A noncontinuous fiber is any fiber which is not continuous, such as a staple fiber. The term also is meant to include both the singular and the plural. That is, the term "fiber" is intended to encompass a single fiber or a plurality of fibers.

As used herein, the term "nonwoven web" is meant to include any nonwoven web, including those prepared by such melt-extrusion processes as meltblowing, coforming, and spunbonding. The term also includes nonwoven webs prepared by air laying or wet laying relatively short fibers to form a web or sheet. Thus, the term includes nonwoven webs prepared from a paper making furnish. Such furnish may include only cellulose fibers, a mixture of cellulose fibers and synthetic fibers, or only synthetic fibers. When the furnish contains only cellulose fibers or a mixture of cellulose fibers and synthetic fibers, the resulting web is referred to herein as a "cellulosic nonwoven web." Of course, such web also may contain additives and other materials, such as fillers, e.g., clay and titanium dioxide, as is well known in the papermaking art.

As already indicated, a nonwoven web desirably will be formed by such well-known processes as meltblowing, coforming, spunbonding, and the like. By way of illustration only, such processes are exemplified by the following references, each of which is incorporated herein by reference:

(a) meltblowing references include, by way of example, U.S. Pat. Nos. 3,016,599 to R. W. Perry, Jr., 3,704,198 to J. S. Prentice, 3,755,527 to J. P. Keller et al., 3,849,241 to R. R. Butin et al., 3,978,185 to R. R. Butin et al., and 4,663,220 to T. J. Wisneski et al. See, also, V. A. Wente, "Superfine Thermoplastic Fibers", *Industrial and Engineering Chemistry,* Vol. 48, No. 8, pp. 1342–1346 (1956); V. A. Wente et al., "Manufacture of Superfine Organic Fibers", Navy Research Laboratory, Washington, D.C., NRL Report 4364 (111437), dated May 25, 1954, United States Department of Commerce, Office of Technical Services; and Robert R. Butin and Dwight T. Lohkamp, "Melt Blowing—A One-Step Web Process for New Nonwoven Products", *Journal of the Technical Association of the Pulp and Paper Industry,* Vol. 56, No.4, pp. 74–77 (1973);

(b) coforming references (i.e., references disclosing a meltblowing process in which fibers or particles are commingled with the meltblown fibers as they are formed) include U.S. Pat. Nos. 4,100,324 to R. A. Anderson et al. and 4,118,531 to E. R. Hauser; and (c) spunbonding references include, among others, U.S. Pat. Nos. 3,341,394 to Kinney, 3,655,862 to Dorschner et al., 3,692,618 to Dorschner et al., 3,705,068 to Dobo et al., 3,802,817 to Matsuki et al., 3,853,651 to Porte, 4,064,605 to Akiyama et al., 4,091,140 to Harmon, 4,100,319 to Schwartz, 4,340,563 to Appel and Morman, 4,405,297 to Appel and Morman, 4,434,204 to Hartman et al., 4,627,811 to Greiser and Wagner, and 4,644,045 to Fowells.

Other methods for preparing nonwoven webs are, of course, known and may be employed. Such methods include air laying, wet laying, carding, and the like. In some cases, it may be either desirable or necessary to stabilize the nonwoven web by known means, such as thermal pattem bonding, through-air bonding, and hydroentangling.

The terms "durable" and "retain the ink jet inks" are synonymous and mean that the ink jet inks placed on a substrate in accordance with the present invention are stable or durable in the presence of moisture or water. That is, after fusing the coating, the ink jet inks, for all practical purposes, are not removed by water. Thus, the image formed on the substrate by the ink jet inks essentially retains its original shape and brightness in the presence of water.

In general terms, the coating of the present invention is suitable for cellulosic nonwoven webs, such as paper; film; yams; fabric; and any other substrate which is capable of being printed on by an ink jet printer. The coating is absorbent and accepts ink jet printing with minimal feathering or bleeding. After printing, the coating is fused by heating to around 350° F. (about 177° C.). Fusing consolidates the coating into a durable film which retains the ink jet inks when the substrate is soaked in water, even though the inks are water soluble.

In one embodiment, the coating composition of the present invention is an aqueous dispersion of from about 2 to about 40 percent by dry weight, based on the dry weight of the coating composition, of a cationic polymer; and from about 60 to about 98 percent by dry weight, based on the dry weight of the coating composition, of a nonionic or cationic binder. The coating composition is thermally fusible and adapted to be receptive to ink jet inks and to retain the ink jet inks after being thermally fused.

Examples of cationic polymers include, by way of illustration only, polyamides, amide-epichlorohydrin resins, polyethyleneimines, polyacrylamides, and ureaformaldehyde resins. Examples of nonionic and cationic binders include, also by way of illustration only, acrylic latices, ethylene-vinyl acetate copolymer latices, and polyethylene dispersions.

The solids content of the coating composition may be varied widely, depending upon the substrate to be coated and the method of coating. For example, the solids content of the coating composition may be in a range of from about 5 to about 60 percent by weight, a though lower or higher solids levels may be appropriate in some cases. As another example, the solids content of the coating composition may be in a range of from about 15 to about 45 percent by weight.

In another embodiment, the coating composition includes a powdered thermoplastic polymer and from about 10 to about 150 dry parts by weight, based on 100 dry parts by weight of the powdered thermoplastic polymer, of a binder. The coating composition is thermally fusible and adapted to be receptive to ink jet inks and to retain the ink jet inks after being thermally fused.

Examples of powdered thermoplastic polymers include polyethylenes, such as Micropowders MPP 635G, and polyamides, such as Orgasol® 3501 EXD NAT1. Examples of binders include, in addition to those listed above, poly (vinyl acetate) latices, styrene-acrylate copolymer latices, and poly(vinyl chloride) latices.

In a further embodiment, the coating composition is an aqueous dispersion of a powdered thermoplastic polymer; from about 2 to about 50 dry parts by weight, based on 100 dry parts by weight of the powdered thermoplastic polymer, of a cationic polymer; and from about 10 to about 150 dry parts by weight, based on 100 dry parts by weight of the powdered thermoplastic polymer, of a nonionic or cationic binder. As with the preceding embodiments, the coating composition is thermally fusible and adapted to be receptive to ink jet inks and to retain the ink jet inks after being thermally fused.

By way of illustration, a coating composition which contains polyamide polymer particles, a cationic polymer, and an ethylene-vinyl acetate latex binder results in a coating which gives little to no ink bleed or feathering, fast ink drying, and excellent resolution. Furthermore, no pressure is needed after printing to obtain a durable, water-fast image.

The coating composition of the present invention also may include a surfactant, typically at a level of from about 1 to about 5 parts by weight, based on the weight of the coating composition. In general, the surfactant may be anionic, cationic, or nonionic, unless a cationic polymer is present in the coating composition. When a cationic polymer is present, the surfactant may be a cationic or nonionic surfactant. For example, the surfactant may be a nonionic surfactant.

If desired, the coating composition also may contain minor amounts of other materials, examples of which are fillers, such as silica; antifoaming agents; and the like.

As noted earlier, the present invention also provides a method for producing a durable image on a substrate with water-soluble inks. The method encompasses providing a substrate as already defined and coating the substrate with a coating composition. The coating composition encompasses an aqueous dispersion of a powdered thermoplastic polymer; from about 2 to about 50 dry parts by weight, based on 100 dry parts by weight of the powdered thermoplastic polymer, of a cationic polymer; and from about 10 to about 150 dry parts by weight, based on 100 dry parts by weight of the powdered thermoplastic polymer, of a nonionic or cationic binder. The coating composition is thermally fusible and adapted to be receptive to water-soluble inks and to retain the water-soluble inks after being thermally fused. The coated substrate then is dried and an image is printed with water-soluble inks on the coating on the substrate. The resulting image-bearing coating on the substrate then is thermally fused. By way of example, the water soluble inks may be ink jet inks.

In general, the substrate may be coated by any means known to those having ordinary skill in the art. For example, the substrate may be coated by spraying, dipping and nipping, doctor blade, silk-screening, direct and offset gravure printing, and the like. Drying and fusing of the coating also may be carried out by known means. Drying typically will be accomplished at temperatures below about 100° C. The fusing temperature typically will depend on the coating composition, but generally may be in a range of from about 150° C. to about 200° C. However, lower or higher fusing temperatures may be appropriate in some instances.

The present invention is further described by the examples which follow. Such examples, however, are not to be construed as limiting in any way either the spirit or the scope of the present invention. In the examples, all parts are dry parts by weight per 100 parts by weight of powdered thermoplastic polymer unless stated otherwise.

EXAMPLE 1

A coating composition was prepared which consisted of a 30% total solids mixture of 100 dry parts of a polyamide (Orgasol® 3501 EXD NAT1, a 10-micrometer average particle size copolymer of ϵ-caprolactam and laurolactam, having a melting point of 160° C. and available from Elf Atochem, France), 50 dry parts of a poly(vinyl alcohol)-stabilized ethylene-vinyl acetate copolymer (Airflex® 140, available from Air Products and Chemicals, Inc., Allentown, Pa.), 13.5 dry parts of an amideepichlorohydrin cationic copolymer (Reten® 204LS, supplied by Hercules Inc., Wilmington, Del.), and 5 dry parts of a polyethoxylated octylphenol nonionic surfactant (Triton® X100, Rohm & Haas Co., St. Louis, Mo.). The coating composition was applied to both a commercially available, uncoated durable label stock and a commercially available banner material. A #24 Meyer rod was used to apply the coating composition in each case, resulting in a coating basis weight of about 22 grams per square meter (gsm) of dry coating. The coating was dried at 85° C. A test pattern with a Canon BJC 600 ink jet printer gave a very well-resolved image on both substrates with little or no feathering. After fusing at 350° F. (about 177° C.) either for 30 seconds in an oven or for 15 seconds in a heat press against a release paper, the coating consolidated, or fused, and the inks bled only a trace of color into water after soaking for two days.

EXAMPLE 2

The coating composition described in Example 1 was used to treat a rayon yarn (type 152/SS from Robison-Anton) by dipping the yarn into the coating composition and removing excess composition with a rubber-over-steel nip wringer. Wet pickup was 7.5 parts per 100 parts yarn. After drying at 95° C., the yarn was tested by dipping yarn samples separately into each of four ink jet inks from Independent Ink Co., i.e., cyan, magenta, yellow, and black. The yarn samples were blotted with absorbent paper to remove excess ink, then heat treated with no pressure for 30 seconds at 175° C. When placed between wet blotters and pressed, there was a little ink bleed into the blotters from each yarn sample.

EXAMPLE 3

The procedure of Example 2 was repeated, except that the amount of cationic polymer in the coating composition was increased from 50 parts to 100 parts . Yarn treated as described in Example 2 gave only faint traces of dye on the wet blotters for the cyan, magenta and yellow inks, and slightly greater black staining. The yarn colors were dark and rich, indicating good absorbency of the yarn before fusing. If the yarn was heat treated for 30 seconds at 175° C. before dipping, it accepted the ink poorly and subsequent heat treating was not effective for retaining the dyes. The yarn apparently required a higher proportion of cationic polymer because the total amount of coating was only about 7.5 parts per hundred parts of fiber. Treating the yarn with the cationic polymer alone did not provide any dye retention to the yarn, nor did treating it with binder alone. Fairly good dye retention could be obtained with a combination of cationic polymer and binder, but dye pickup was lower.

While the specification has been described in detail with respect to specific embodiments thereof, it will be appreciated by those skilled in the art, upon attaining an understanding of the foregoing, may readily conceive of alterations to, variations of, and equivalents to these embodiments. Accordingly, the scope of the present invention should be assessed as that of the appended claims and any equivalents thereto. For example, the coating composition of the present invention should be effective with any water-soluble ink system, not just ink jet printer inks. Other variations and modifications will be readily apparent to those having ordinary skill in the art.

What is claimed is:

1. A coating composition comprising an aqueous dispersion of:

from about 2 to about 40 percent by dry weight, based on the dry weight of the coating composition, of a water-soluble cationic polymer; and from about 60 to about 98 percent by dry weight, based on the dry weight of the coating composition, of a nonionic latex binder; wherein the coating composition is thermally fusible and adapted to be receptive to ink jet inks and to retain the ink jet inks after being thermally fused.

2. The coating composition of claim 1 which further comprises from about 1 to about 5 parts by weight, based on the weight of the coating composition, of a nonionic or cationic surfactant.

3. The coating composition of claim 2, in which the surfactant is a nonionic surfactant.

4. A coating composition comprising an aqueous dispersion of:

a powdered thermoplastic polymer;

from about 2 to about 50 dry parts by weight, based on 100 dry parts by weight of the powdered thermoplastic polymer, of a water-soluble cationic polymer; and from about 10 to about 150 dry parts by weight, based on 100 dry parts by weight of the powdered thermoplastic polymer, of a nonionic or cationic latex binder; wherein the coating composition is thermally fusible and adapted to be receptive to ink jet inks and to retain the ink jet inks after being thermally fused.

5. The coating composition of claim 4 which further comprises from about 1 to about 10 parts of a nonionic or cationic surfactant.

6. The coating composition of claim 5, in which the surfactant is a nonionic surfactant.

7. The coating composition of claim 4, in which the powdered thermoplastic polymer is a polyethylene.

8. The coating composition of claim 4, in which the powdered thermoplastic polymer is a polyamide.

9. The coating composition of claim 8, in which the powdered thermoplastic polymer is a copolymer of ϵ-caprolactam and laurolactam.

10. The coating composition of claim 8, in which the cationic polymer is an amide-epichlorohydrin copolymer.

11. The coating composition of claim 8, in which the binder is an ethylene-vinyl acetate copolymer.

12. A coating composition comprising an aqueous dispersion of:

a powdered thermoplastic polymer;

from about 2 to about 50 dry parts by weight, based on 100 dry parts by weight of the powdered thermoplastic polymer, of a water-soluble cationic polymer; and from about 10 to about 150 dry parts by weight, based on 100 dry parts by weight of the powdered thermoplastic polymer, of a nonionic or cationic latex binder; wherein the coating composition is thermally fusible and adapted to be receptive to water-soluble inks and to retain the water-soluble inks after being thermally fused.

* * * * *

UNITED STATES PATENT AND TRADEMARK OFFICE

CERTIFICATION OF CORRECTION

PATENT NO. : 5,925,712

DATED : July 20, 1999

INVENTOR(S): Kronzer

It is certified that error appears in the above-identified patent and that said Letters Patent is hereby corrected as shown below:

Title page, Patent 4,250,269 "524/514" should read --525/6--;
Title page, Patent 4,405,297 "425/725" should read --425/72.S--;
Title page, Patent 4,442,247 "524/502" should read --523/414--;
Title page, Patent 4,547,405 "428/331" should read --427/256--;
Title page, Patent 4,785,313 "Higura et al." should read --Higuma et al.--;
Title page, Patent 4,785,313 "427/161" should read --346/135.1;
Page 2, Patent 5,178,944 "Horiuichi et al." should read --Horiuchi--;
Page 2, Patent 5,274,055 "524/555" should read --524/47--.

Signed and Sealed this

Eleventh Day of April, 2000

Attest:

Q. TODD DICKINSON

Attesting Officer

*Director of Patents and Trademarks*